(12) United States Patent
Chen et al.

(10) Patent No.: US 9,731,446 B2
(45) Date of Patent: Aug. 15, 2017

(54) DULL POLYAMIDE 56 FIBER AND METHOD FOR MANUFACTURING THE SAME

(71) Applicant: CHAIN YARN CO., LTD., Taichung (TW)

(72) Inventors: Yen-Hsiao Chen, Yunlin County (TW); Tsung-Hsien Chao, Taichung (TW); Shih-Yang Chen, Chiayi County (TW); I-Chen Hsieh, Chiayi (TW)

(73) Assignee: CHAIN YARN CO., LTD., Taichung (TW)

( * ) Notice: Subject to any disclaimer, the term of this patent is extended or adjusted under 35 U.S.C. 154(b) by 201 days.

(21) Appl. No.: 14/829,647

(22) Filed: Aug. 19, 2015

(65) Prior Publication Data

US 2016/0176094 A1    Jun. 23, 2016

(30) Foreign Application Priority Data

Dec. 19, 2014  (TW) .............................. 103144562 A (51) Int. Cl.

| | |
|---|---|
| *D01F 6/90* | (2006.01) |
| *B29C 47/00* | (2006.01) |
| *B29C 47/08* | (2006.01) |
| *B29C 47/88* | (2006.01) |
| *B29C 47/92* | (2006.01) |
| *D01D 1/00* | (2006.01) |
| *D01D 5/16* | (2006.01) |
| *D01F 1/04* | (2006.01) |

(Continued)

(52) U.S. Cl.
CPC ...... *B29C 47/0014* (2013.01); *B29C 47/0801* (2013.01); *B29C 47/8815* (2013.01); *B29C 47/92* (2013.01); *D01D 1/00* (2013.01); *D01D 5/16* (2013.01); *D01F 1/04* (2013.01); *D01F 6/90* (2013.01); *B29C 2947/92704* (2013.01); *B29K 2077/00* (2013.01); *B29L 2031/731* (2013.01)

(58) Field of Classification Search
None
See application file for complete search history.

(56) References Cited

U.S. PATENT DOCUMENTS

| 2011/0020628 A1* | 1/2011 | Fukudome | ............. C08G 69/26 428/221 |
|---|---|---|---|
| 2012/0145632 A1* | 6/2012 | Dullaert | ............. B01D 39/1623 210/650 |

(Continued)

*Primary Examiner* — Mary F Theisen
(74) *Attorney, Agent, or Firm* — CKC & Partners Co., Ltd.

(57) ABSTRACT

A method for manufacturing a dull polyamide 56 fiber includes steps as follows. Bright polyamide 56 chips are provided. A viscosity adjusting step is provided, wherein a relative viscosity in sulfuric acid of the bright polyamide 56 chips is adjusted to a range of 2.90 to 3.00. A moisture adjusting step is provided, wherein a moisture content of the bright polyamide 56 chips is adjusted to a range of 350 to 550 ppm. A spinning step is provided, which includes providing dull polyamide 6 chips and a blending step. The dull polyamide 6 chips include $TiO_2$. In the blending step, the dull polyamide 6 chips and the bright polyamide 56 chips dealt with the viscosity adjusting step and the moisture adjusting step are melted and blended, and then spun at a temperature ranging from 275° C. to 285° C., thus the dull polyamide 56 fiber is obtained.

10 Claims, 4 Drawing Sheets

(51) Int. Cl.
    *B29K 77/00*    (2006.01)
    *B29L 31/00*    (2006.01)

(56) References Cited

U.S. PATENT DOCUMENTS

2013/0261256 A1* 10/2013 Ieda .................. C08G 69/26
                                                    524/607
2013/0280513 A1* 10/2013 Itou .................. D01D 5/12
                                                    428/221

* cited by examiner

Fig. 1

140 a plurality of dull polyamide 6 chips are provided — 141 a blending step is provided — 142

DULL POLYAMIDE 56 FIBER AND METHOD FOR MANUFACTURING THE SAME

RELATED APPLICATIONS

This application claims priority to Taiwan Application Serial Number 103144562, filed Dec. 19, 2014, which is herein incorporated by reference.

BACKGROUND

Technical Field

The present disclosure relates to a polyamide 56 fiber and a method for manufacturing the same. More particularly, the present disclosure relates to a dull polyamide 56 fiber and a method for manufacturing the same.

Description of Related Art

A polyamide refers to a polymer formed from monomers having a carboxyl group and monomers having an amino group polymerized via an amide bond. The manufacturing process of the polyamide is sample, and the polyamide has excellent durability and strength. Thus, the polyamide is widely applied to a variety of fields, such as textiles, auto parts, electronics and food package. A polyamide 66 (also known as nylon 66) is a kind of polyamide, which is the product of the condensing polymerization of adipic acid and hexamethylenediamine. The polyamide 66 can be made into filaments easily, and the textiles made of the filaments are featured with excellent quality. As a result, the polyamide 66 has been the mainstream material in the field of textiles, and the manufacturing technique of the polyamide 66 fibers is well developed.

Among the synthetic monomers of the polyamide 66, the adipic acid can be synthesized by techniques of biocatalysis. However, the synthesis of the hexamethylenediamine still relies on petrochemical products. As the environmental issues arising from the soaring international oil prices, the depletion and the large consumption of the fossil resources, industries and scholars in related fields are actively seeking for diamine compounds synthesized by techniques of biology to replace the hexamethylenediamine, so that the polyamide made from the diamine compounds can meet the environmental demands.

It is known that one of the diamine compounds which can replace the hexamethylenediamine is pentanediamine. The pentanediamine can be obtained by the decarboxylation of the lysine which is occurred by catalyzing the lysine with a lysine decarboxylase. It is proved that the pentanediamine can be successfully synthesized by the technique of biology, which adopts *Escherichia coli* (abbreviated as *E. coli*) and *Corynebacterium glutamicum* as engineering bacteria. The pentanediamine can be further reacted with the adipic acid, succinic acid or sebacic acid so as to form a new material, such as polyamide 56, polyamide 54 or polyamide 510, which allows the polyamide to become a promising bioplastic material Among the aforementioned new materials, the polyamide 56 is regarded as an alternative of the polyamide 66 being the mainstream material in the field of textiles.

However, as one of the synthetic monomers of the polyamide 56, the pentanediamine has five carbon atoms, which is one less than that of the hexamethylenediamine. Accordingly, the polyamide 56 and the polyamide 66 have many different properties, such as melting point and crystallinity. Therefore, the conventional manufacturing technique of the polyamide 66 fibers cannot apply to manufacture the polyamide 56 fibers. Take the manufacture of semi-dull polyamide 56 fibers or full-dull polyamide 56 fibers as example, the conventional manufacturing technique of the semi-dull or full-dull polyamide 66 fibers is adding commercially available polyamide 6 chips which contains $TiO_2$ during the polymerization process, whereby the resulting fibers are semi-dull or full-dull. However, the melting point of the commercially available polyamide 56 chips without $TiO_2$ is about 256° C. The melting point of the commercially available polyamide 6 chips which contains $TiO_2$ is about 220° C. A spinning temperature required by the polyamide 56 chips is different from that of the polyamide 6 chips (the spinning temperature refers to the temperature of the manifold and the spinning beam during the spinning process). When the spinning temperature is excessively high, a thermal decomposition of the plastic chips having a lower melting point may occur; when the spinning temperature is excessively low, the plastic chips having a higher melting point may melt incompletely. As a result, a phase separation of the resulting semi-dull polyamide 56 fibers or full-dull polyamide 56 fibers is generated. Thus, the resulting semi-dull polyamide 56 fibers or full-dull polyamide 56 fibers have poor uniformity and poor spinnability. Furthermore, the spinning conditions of the spinning process are mutually influenced by each other. Even only one spinning condition is changed, such as the spinning temperature, if the other spinning conditions do not adjusted accordingly, such as the relative viscosity in sulfuric acid and the moisture content, there is a high possibility that the resulting fibers have poor quality. Therefore, how to develop the spinning conditions suitable for the polyamide 56 so as to manufacture the polyamide 56 fibers meeting the demands is the goal of the related industries.

SUMMARY

According to one aspect of the present disclosure, a method for manufacturing a dull polyamide 56 fiber includes steps as follows. A plurality of bright polyamide 56 chips are provided. A viscosity adjusting step is provided, wherein a relative viscosity in sulfuric acid of the bright polyamide 56 chips is adjusted to a range of 2.90 to 3.00. A moisture adjusting step is provided, wherein a moisture content of the bright polyamide 56 chips is adjusted to a range of 350 ppm to 550 ppm. A spinning step is provided. The spinning step includes steps as follows. A plurality of dull polyamide 6 chips are provided, wherein the dull polyamide 6 chips comprise titanium dioxide ($TiO_2$). A blending step is provided, wherein the dull polyamide 6 chips and the bright polyamide 56 chips dealt with the viscosity adjusting step and the moisture adjusting step are melted and blended, and then spun at a temperature ranging from 275° C. to 285° C., thus the dull polyamide 56 fiber is obtained.

According to another aspect of the present disclosure, a dull polyamide 56 fiber is provided. The dull polyamide 56 fiber can be made by the method according to the aforementioned aspect. A denier per filament of the dull polyamide 56 fiber is 0.5 dpf to 6 dpf, and a strength of the dull polyamide 56 fiber is 3.0 g/d to 6.8 g/d.

BRIEF DESCRIPTION OF THE DRAWINGS

The disclosure can be more fully understood by reading the following detailed description of the embodiment, with reference made to the accompanying drawings as follows.

DETAILED DESCRIPTION

Method For Manufacturing A Dull Polyamide 56 Fiber

Figure 1:
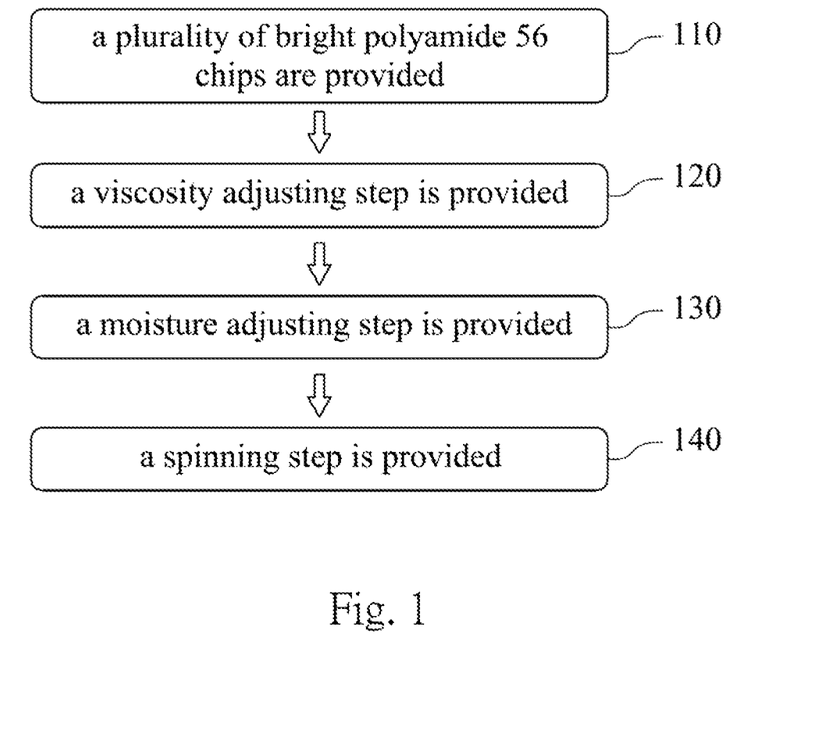
FIG. 1 is a flow diagram showing a method for manufacturing a dull polyamide 56 fiber according to one embodiment of the present disclosure.

FIG. 1 is a flow diagram showing a method for manufacturing a dull polyamide 56 fiber according to one embodiment of the present disclosure. In FIG. 1, the method for manufacturing the dull polyamide 56 fiber includes Step 110, Step 120, Step 130 and Step 140.

In Step 110, a plurality of bright polyamide 56 chips are provided. A melting point of the bright polyamide 56 chips is about 254° C. to 256° C. A relative viscosity in sulfuric acid of the bright polyamide 56 chips is about 2.7. The bright polyamide 56 chips are mainly composed of polyamide 56. The polyamide 56 is copolymerized by pentanediamine and adipic acid. A weight average molecular weight of the polyamide 56 is ranging from 80000 to 85000. The pentanediamine can be synthesized by a biological method. In other words, the bright polyamide 56 chips according to the present disclosure can be bioplastic materials, and the synthesis of each of the monomers thereof hasn't to rely on petrochemical products. Accordingly, the method according to present disclosure can meet the environmental demands. The bright polyamide 56 chips can be selected from commercially available products.

In Step 120, a viscosity adjusting step is provided, wherein the relative viscosity in sulfuric acid of the bright polyamide 56 chips is adjusted to a range of 2.90 to 3.00. When the relative viscosity in sulfuric acid of the bright polyamide 56 chips is less than 2.90, the strength of the dull polyamide 56 fiber is low. When the relative viscosity in sulfuric acid of the bright polyamide 56 chips is greater than 3.00, the flow rate of the spun liquid is slow thereby. As a result, the residence time of the spun liquid in the manifold is prolonged, and is unfavorable for spinning.

In Step 130, a moisture adjusting step is provided, wherein a moisture content of the bright polyamide 56 chips is adjusted to a range of 350 ppm to 550 ppm. Therefore, the moisture content of the bright polyamide 56 chips is proper, better spinning properties can be obtained, and the probability of fiber break and degradation of the polyamide 56 can be reduced.

Figure 2:
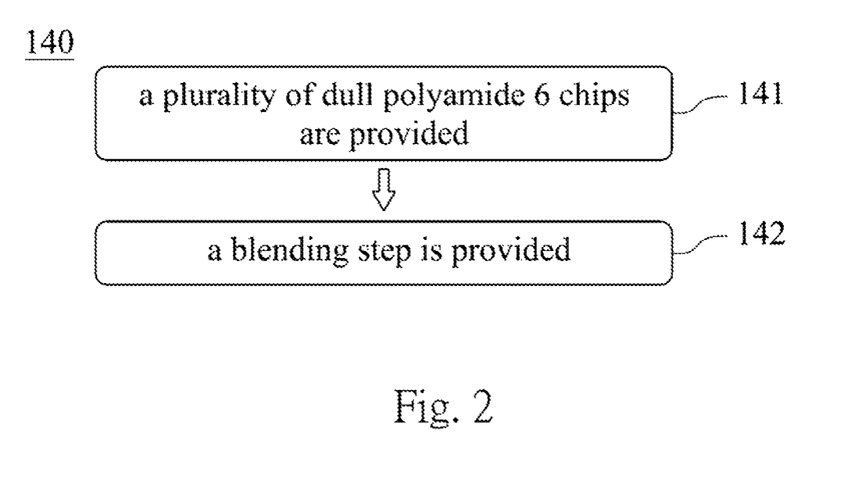
FIG. 2 is a flow diagram showing Step 140 in FIG. 1.

In Step 140, a spinning step is provided, whereby the dull polyamide 56 fiber is obtained. The aforementioned "dull polyamide 56 fiber" is a fiber whose luster is semi-dull or dull with respect to a bright fiber. FIG. 2 is a flow diagram showing Step 140 in FIG. 1. In FIG. 2, Step 140 includes Step 141 and Step 142.

In Step 141, a plurality of dull polyamide 6 chips are provided, wherein the dull polyamide 6 chips include titanium dioxide ($TiO_2$). Therefore, the finally resulting fiber (i.e., the dull polyamide 56 fiber) is semi-dull or dull, and has a UV resistant property. According to one embodiment of the present disclosure, the dull polyamide 56 fiber includes from 0.25% to 2.0% by weight of the titanium dioxide.

A melting point of the dull polyamide 6 chips is about 218° C. to 220° C. A relative viscosity in sulfuric acid of the dull polyamide 6 chips is about 2.7. The dull polyamide 6 chips can include 10% to 20% by weight of the titanium dioxide, and the rest amount of the dull polyamide 6 chips is polyamide 6. The polyamide 6 is formed from a ring-opening polymerization of caprolactam. A weight average molecular weight of the polyamide 6 is ranging from 50000 to 54000. According to one embodiment of the present disclosure, the dull polyamide 6 chips include 20% by weight of the titanium dioxide, and an adding amount of the dull polyamide 6 chips is greater than 0 part by weight, and is lesser than or equal to 10 parts by weight based on 100 parts by weight of the bright polyamide 56 chips. When the adding amount of the dull polyamide 6 chips is greater than 10 parts by weight, a phase separation tends to occur, and the fiber break may occur after the spun liquid goes through the spinneret. The dull polyamide 6 chips can be selected from commercially available products.

In Step 142, a blending step is provided, wherein the dull polyamide 6 chips and the bright polyamide 56 chips dealt with the viscosity adjusting step and the moisture adjusting step are melted and blended, and then spun at a temperature ranging from 275° C. to 285° C. When the temperature is less than 275° C., the current of the extruder increases, which is unfavorable for the melt of the polyamide 56. When the temperature greater than 285° C., the polyamide 56 tends to decomposed and cannot be spun.

Figure 3:
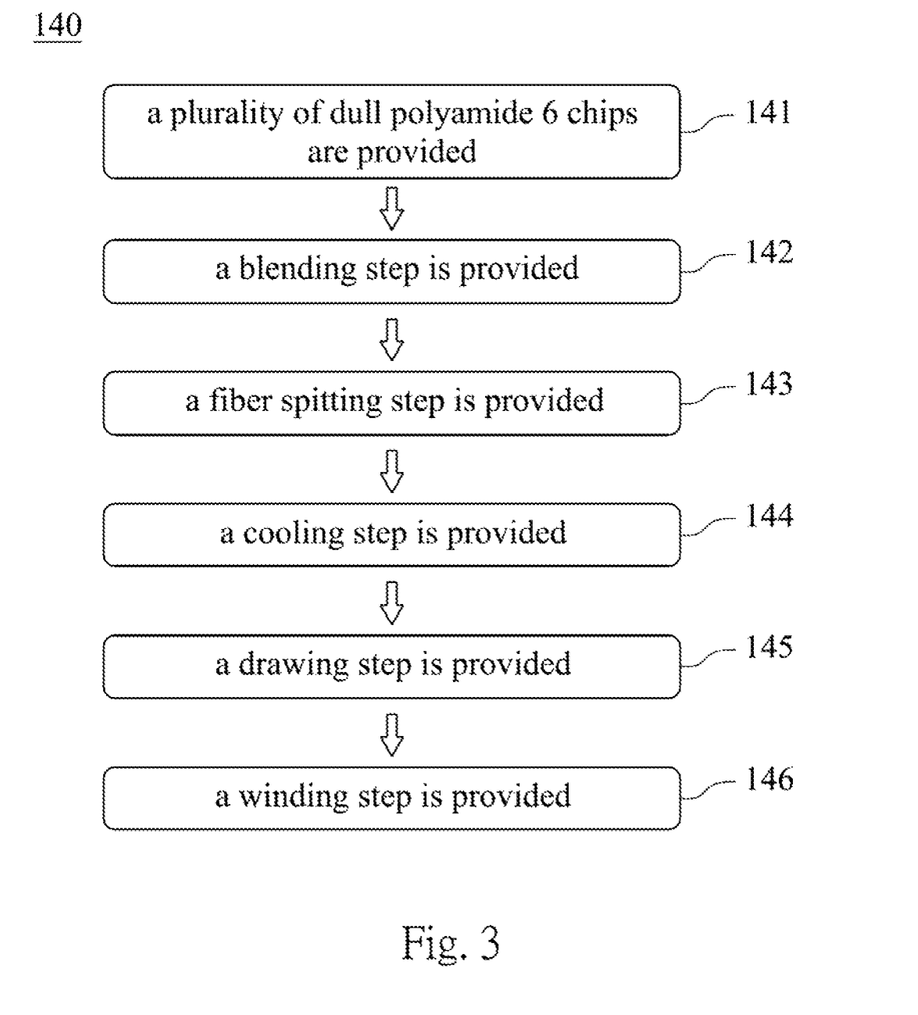
FIG. 3 is a flow diagram showing Step 140 according to another embodiment of the present disclosure.

FIG. 3 is a flow diagram showing Step 140 according to another embodiment of the present disclosure. In FIG. 3, Step 140 includes Step 141, Step 142, Step 143, Step 144 Step 145 and Step 146.

In Step 141, a plurality of dull polyamide 6 chips are provided. The details of Step 141 are the same as that in FIG. 2, and will not be repeated herein.

In Step 142, a blending step is provided, wherein the dull polyamide 6 chips and the bright polyamide 56 chips dealt with the viscosity adjusting step and the moisture adjusting step are melted and blended at a temperature ranging from 275° C. to 285° C. so as to form a spun liquid.

In Step 143, a fiber spitting step is provided, wherein the spun liquid goes through a spinneret so as to form a nascent fiber. When a difference between a relative viscosity in sulfuric acid of the nascent fiber and the relative viscosity in sulfuric acid of the bright polyamide 56 chips dealt with the viscosity adjusting step is ΔRV (the relative viscosity in sulfuric acid of the nascent fiber is RV1, the relative viscosity in sulfuric acid of the bright polyamide 56 chips dealt with the viscosity adjusting step is RV2, ΔRV=RV1−RV2), the following relationship can be satisfied: 0<RV<0.1. Therefore, it is favorable to spin at a high speed, and the dyeability of the dull polyamide 56 fiber is excellent.

In Step 144, a cooling step is provided. The cooling step is conducted at a temperature ranging from 18° C. to 22° C., wherein the nascent fiber is solidified so as to form a solidified fiber. When the temperature is less than 18° C., the cooling is too fast, and the uniaxial alignment of the molecules is affected. When the temperature is greater than 22° C., the cooling is insufficient, and the solidified fiber is not easy to be drawn.

In Step 145, a drawing step is provided, wherein the solidified fiber is drawn with a draw ratio ranging from 1.2% to 1.5%. The draw ratio is calculated from the following equation: draw ratio=(output speed/input speed)×100%. When the draw ratio is less than 1.2%, the probability of the fiber break is increased. When the draw ratio is greater than 1.5%, the solidified fiber is excessively drawn, and the solidified fiber tends to break. Furthermore, the drawing step can include a heating step, wherein the solidified fiber is heated at a temperature ranging from 145° C. to 200° C., whereby the solidified fiber is heat set. When the temperature is excessively high, the solidified fiber shakes vigorously on the godet roller assembly. Accordingly, the tension is too small, and it is unfavorable for spinning. When the temperature is excessively low, the solidified fiber is heat set insufficiently. Accordingly, the stress in the molecular chain is increased, and it is unfavorable to form a spinning cake.

In Step 146, a winding step is provided, wherein the solidified fiber dealt with the drawing step is wound in a speed ranging from 3200 m/min to 4800 m/min, and a physical property of the solidified fiber is changed by the drawing step and the winding step, such as strength or elongation, so that the solidified fiber is transformed into the dull polyamide 56 fiber.

Figure 4:
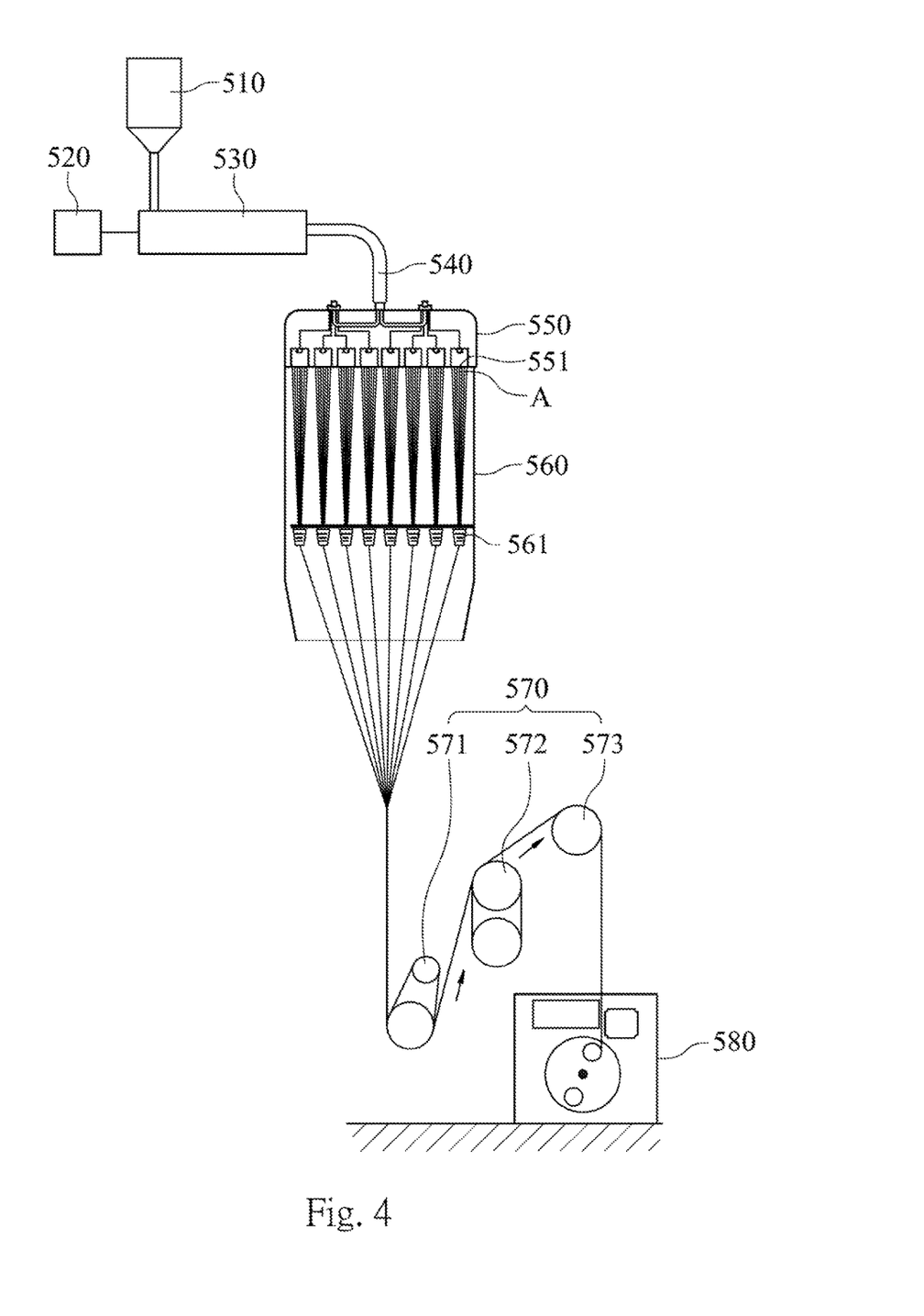
FIG. 4 is a spinning apparatus used in Step 140 in FIG. 3.

FIG. 4 is a spinning apparatus used in Step 140 in FIG. 3. In FIG. 4, the spinning apparatus includes a feeding tank 510, an extruder 530, a servo motor 520 of the extruder 530, a manifold 540, a spinning beam 550, a cooling device 560, a draw device 570 and a winding device 580.

In Step 141, the bright polyamide 56 chips dealt with the viscosity adjusting step and the moisture adjusting step and the dull polyamide 6 chips e put into the feeding tank 510 and then into the extruder 530.

In Step 142, the bright polyamide 56 chips and the dull polyamide 6 chips are melted and blended in the extruder 530, and the temperature is ranging from 272° C. to 295° C. so as to form the spun liquid.

Afterward, the screw (not shown) within the extruder 530 is driven by the servo motor 520 so as to extrude the spun liquid into the manifold 540. The temperature of the manifold 540 is controlled in the range of 275° C. to 285° C., so that the solidification of the spun liquid can be prevented before the spun liquid enters into the spinning beam 550. Furthermore, the residence time of the spun liquid in the manifold 540 is about 250 seconds to 570 seconds.

In Step 143, the spun liquid enters into the spinning beam 550. The spun liquid is distributed to the spinnerets 551 by a metering pump (not shown). The spun liquid goes through the spinnerets 551 so as to form the nascent fibers A. When a difference between the relative viscosity in sulfuric acid of the nascent fibers A and the relative viscosity in sulfuric acid of the bright polyamide 56 chips dealt with the viscosity adjusting step is $\Delta RV$, the following relationship can be satisfied: $0<\Delta RV<0.1$. Furthermore, the temperature of the spinning beam 550 is controlled in the range of 275° C. to 285° C., so that the solidification of the spun liquid can be prevented before the spun liquid goes through the spinnerets 551.

In Step 144, a cooling gas is provided by the cooling device 560 The temperature of the cooling gas is 18° C. to 22° C., the velocity of the cooling gas is 0.45 m/min to 0.55 m/min, and the relative humidity of the cooling gas is 65 to 75. Thus, the nascent fibers A are solidified so as to form the solidified fibers.

Afterward, the solidified fibers are bundled and oiled via the oiling device 561 (such as oiling nozzles or oiling roll). The technique of oiling the solidified fibers is conventional, and will not be described herein.

In Step 145, the solidified fibers are drawn and heat set by the draw device 570. In the embodiment, the draw device 570 includes a first godet roller assembly 571, a second godet roller assembly 572 and a third godet roller assembly 573. The physical properties of the solidified fibers,such as the strength or the elongation, can be improved by the multistage draw. In the aforementioned equation of the draw ratio, the input speed refers to the rotational speed of the first godet roller assembly of the draw device 570. In the embodiment, the input speed is the rotational speed of the first godet roller assembly 571. In the aforementioned equation of the draw ratio, the output speed refers to the rotational speed of the last godet roller assembly of the draw device 570. In the embodiment, the output speed is the rotational speed of the third godet roller assembly 573. The draw ratio is ranging from 1.2% to 1.5%. Furthermore, at least one of the first godet roller assembly 571, the second godet roller assembly 572 and the third godet roller assembly 573 can provide a heating function, so that the solidified fibers can be heat set.

In Step 146, the solidified fibers dealt with the drawing step are wound around a paper tube in a speed ranging from 3200 m/min to 4800 m/min by the winding device 580, so that a spinning cake is obtained, and the physical property of the solidified fibers is changed by the drawing step and the winding step, so that the solidified fibers are transformed into the dull polyamide 56 fiber. In other words, the fiber forming the spinning cake is dull polyamide 56 fiber.

Dull Polyamide 56 Fiber

A dull polyamide 56 fiber according to the present disclosure can be made by the aforementioned method. A denier per filament of the dull polyamide 56 fiber is 0.5 dpf to 6 dpf, and the strength of the dull polyamide 56 fiber is 3.0 g/d to 6.8 g/d. Furthermore, a phase separation can be prevented, so that the dull polyamide 56 fiber has excellent uniformity and spinnability. Accordingly, it is favorable to broaden the application of the dull polyamide 56 fiber, and the production efficiency of the dull polyamide 56 fiber is enhanced.

Methods for Measuring Properties

The method for measuring the relative viscosity in sulfuric acid: the sample (plastic chips or nascent fibers) of 0.25g is dissolved in 98 wt % sulfuric acid, wherein the ratio of the sample to the sulfuric acid is 1 g:100 ml. The flowing time (T1) of the sulfuric acid with the dissolving sample is measured via an Ostwald viscosimeter at 25° C. The flowing time (T2) of the sulfuric acid without the sample is measure via the Ostwald viscosimeter at 25° C. The relative viscosity in sulfuric acid is the ratio of T1 and T2, i.e., the relative viscosity in sulfuric acid equals to T1/T2.

The method for measuring the moisture content (ppm): the moisture content is measured by a Karl Fisher's coulometric titrator (trace moisture measurement device AQ-2000; moisture evaporating device EV-200; made by the Hiranuma Sangyo Co., Ltd), wherein the moisture evaporating temperature is 180° C., and is under dry nitrogen atmosphere.

Furthermore, methods for measuring properties of the dull polyamide 56 fiber are as follows: the denier is measured according to ASTM D1907-2010, the strength (g/d) is measured according to ASTM 2256, the elongation (%) is measured according to ASTM 2256, the uniformity (%) is measured according to ASTM D1425-1996 the shrinkage in hot water is measured according to ASTM D2259-2002, and the dyeability (color fastness) is measured according to CNS 1494 L3027-1999.

EMBODIMENTS

Experimental Embodiment 1

The viscosity adjusting step is provided: bright polyamide 56 chips which are commercially available are put into a drying container, wherein nitrogen gas heated by a dryer to 160° C. is introduced into the drying container at a speed of 470 Nm³hr. The dew point in the drying container is 4° C.

A solid state polymerization of the bright polyamide 56 chips is conducted. The time of the solid state polymerization is 24 hours. The properties of the bright polyamide 56 chips before and after the solid state polymerization are listed in Table 1.

TABLE 1

| | properties before the solid state polymerization | properties after the solid state polymerization |
|---|---|---|
| relative viscosity in sulfuric acid | 2.687 | 2.95 |
| moisture content | 6000 ppm | 1000 ppm |
| concentration of amino groups | 51.12 meq/kg | 37.2 meq/kg |

The bright polyamide 56 chips dealt with the viscosity adjusting step (i.e., the solid state polymerization) is dried at 95° C. under nitrogen atmosphere till the moisture content of the bright polyamide 56 chips is reduced from 1000 ppm to 450 ppm.

Experimental Embodiment 2

Example 1: the bright polyamide 56 chips dealt with the viscosity adjusting step and the moisture adjusting step in Experimental Embodiment 1 provided. Dull polyamide 6 chips which are commercially available are provided, wherein the dull polyamide 6 chips include 20% by weight of the titanium dioxide, so that the resulting dull polyamide 56 fiber can include 2.0% by weight of the titanium dioxide. The bright polyamide 56 chips dealt with the viscosity adjusting step and the moisture adjusting step and the dull polyamide 6 chips are conducted with a spinning step by using the spinning apparatus in FIG. 4. The extruder 530 (purchased from Barmag company) is divided into four regions, the first region, the second region, the third region and the fourth region. The temperature T1 of the first region is set at 272° C., the temperature T2 of the second region is set at 275° C., the temperature T3 of the third region is set at 280° C., and the temperature T4 of the fourth region is set at 282° C. The temperature T5 of the manifold 540 and the spinning beam 550 is set at 282° C. In the draw device 570, the second godet roller assembly 572 can provide the heating function, the rotational speed GR1 of the first godet roller assembly 571 is 3600 m/min, the rotational speed GR2 of the second godet roller assembly 572 is 4790 m/min, the temperature GRT2 of the second godet roller assembly 572 is 195° C., the rotational speed GR3 of the third godet roller assembly 573 is 4780 m/min, the draw ratio GR3/GR1 is 1.33, the rotational speed R of the winding device 580 is 4700 m/min, whereby a 70/68 FD dull polyamide 56 fiber is obtained.

Example 2: the conditions of the spinning step of Example 1 are changes, as listed in Table 2, and the rest steps and conditions of Example 2 are the same as that of Example 1, whereby a 70/68 FD dull polyamide 56 fiber is obtained.

Comparative Example 1: the bright polyamide 56 chips of Example 1 are replaced by bright polyamide 6 chips, and the adding amount of the dull polyamide 6 chips and the conditions of the spinning step of Example 1 are changes, as listed in Table 2, and the rest steps and conditions of Comparative Example 1 are the same as that of Example 1, whereby a 70/48 FD dull polyamide 6 fiber is obtained.

Comparative Example 2: the bright polyamide 56 chips of Example 1 are replaced by bright polyamide 66 chips, and the adding amount of the dull polyamide 6 chips and the conditions of the spinning step of Example 1 are changes, as listed in Table 2, and the rest steps and conditions of Comparative Example 2 are the same as that of Example 1, whereby a 70/68 FD dull polyamide 66 fiber is obtained.

TABLE 2

| | | Example 1 | Example 2 | Comparative Example 1 | Comparative Example 2 |
|---|---|---|---|---|---|
| Specification | | FD | FD | FD | FD |
| denier per filament | | 70/68 | 70/48 | 70/48 | 70/68 |
| Content of TiO$_2$ | | 2.0% | 2.0% | 1.5% | 1.5% |
| Temperature of the extruder | T1(° C.) | 272 | 272 | 255 | 292 |
| | T2(° C.) | 275 | 275 | 258 | 283 |
| | T3(° C.) | 280 | 280 | 280 | 286 |
| | T4(° C.) | 282 | 282 | 262 | 288 |
| T5(° C.) | | 282 | 285 | 262 | 288 |
| GR1(m/min) | | 3600 | 3650 | 3600 | 3600 |
| GR2(m/min) | | 4790 | 4780 | 4560 | 4680 |
| GRT2(° C.) | | 195 | 145 | 140 | 160 |
| GR3(m/min) | | 4780 | 4770 | 4550 | 4660 |
| draw ratio | | 1.33 | 1.31 | 1.26 | 1.29 |
| R(m/min) | | 4700 | 4700 | 4500 | 4600 |

The properties of the dull polyamide 56 fiber of Example 1, the dull polyamide 56 fiber of Example 2, the dull polyamide 6 fiber of Comparative Example 1, and the dull polyamide 66 fiber of Comparative Example 2 are measured. The properties are denier, strength, elongation, shrinkage in hot water, mean ultraviolet protection factor (Mean UPF) and color fastness, and the measured results are listed in Table 3.

TABLE 3

| | Example 1 | Example 2 | Comparative Example 1 | Comparative Example 2 |
|---|---|---|---|---|
| denier | 70.1 | 70.1 | 69.8 | 69.9 |
| strength (g/d) | 5.2 | 4.51 | 5.0 | 5.3 |
| elongation (%) | 44 | 49.7 | 45 | 49 |
| shrinkage in hot water (%) | 12.3 | 15.3 | 9.0 | 6.0 |
| Mean UPF | 70 | 72 | 43 | 48 |
| color fastness | 4.5 grade | 4.5 grade | 4.5 grade | 4.5 grade |

As shown in Table 3, in Example 1 and Example 2, the denier is 70.1, the strength is in the range of 4.51 g/d to 5.2 g/d, the elongation is in the range of 44% to 49.7%, which show that the dull polyamide 56 fiber according to the present disclosure can satisfy the physical properties, such as strength and elongation, while having a small denier. Therefore, it is favorable for following applications. In Example 1 and Example 2, the shrinkage in hot water is in the range of 12.3% to 15.3% showing that the dull polyamide 56 fiber according to the present disclosure has excellent shrinkage in hot water. The shrinkage in hot water of Example 1 and Example 2 both are greater than that of the conventional polyamide 6 fiber (Comparative Example 1) and polyamide 66 fiber (Comparative Example 2). Therefore, it is favorable to be applied to heat shrinkable products. In Example 1 and Example 2, the Mean UPF is in the range of 70 to 72 showing the that the dull polyamide 56 fiber according to the present disclosure has excellent UV resistant ability. The Mean UPF of Example 1 and Example 2 both are greater than that of Comparative Example 1 and Comparative Example 2. Therefore, it is favorable to be applied to UV resistant products. The color fastness of Example 1 and Example 2 both are 4.5 grades showing that the dull polyamide 56 fiber according to the present disclosure has excellent dyeability.

Experimental Embodiment 3

Example 3: the bright polyamide 56 chips dealt with the viscosity adjusting step and the moisture adjusting step in Experimental Embodiment 1 are provided. The temperature T1 of the first region of the extruder 530 is set at 272° C., the temperature T2 of the second region of the extruder 530 is set at 275° C., the temperature T3 of the third region of the extruder 530 is set at 280° C., and the temperature T4 of the fourth region of the extruder 530 is set at 282° C. The temperature T5 of the manifold 540 and the spinning beam 550 is set at 282° C. The relative viscosity in sulfuric acid and the concentration of amino groups are measured when the spun liquid goes through the spinneret with different spitting amount. The measured results are listed in Table 4.

Comparative Example 3: the moisture content of the bright polyamide 56 chips of Comparative Example 3 is 670 ppm, and the rest steps and conditions of Comparative Example 3 are the same as that of Example 3. In Table 4, t refers to the residence time of the spun liquid in the manifold 540.

TABLE 4

| | the residence time of the spun liquid in the manifold 540 t(s) | relative viscosity in sulfuric acid of the nascent fiber | ΔRV |
|---|---|---|---|
| Comparative Example 3 (the moisture content is 670 ppm) | 1040 | 2.835 | −0.115 |
| | 570 | 2.923 | −0.027 |
| | 325 | 2.875 | −0.075 |
| | 252 | 2.872 | −0.078 |
| Example 3 (the moisture content is 480 ppm) | 1040 | 2.922 | −0.028 |
| | 570 | 2.978 | 0.028 |
| | 325 | 2.971 | 0.021 |
| | 252 | 2.992 | 0.042 |

As shown in Table 4, when the moisture content of the is excessively high, A ΔRV is easy beyond the range of the following relationship: 0<ΔRV<0.1 Furthermore, it is not favorable to spin at a high speed, and the dyeability of the dull polyamide 56 fiber is poor. Therefore, the moisture content of the bright polyamide 56 chips according to the present disclosure is adjusted to 350 ppm to 550 ppm, which is favorable to reduce the value of ΔRV. Accordingly, it is favorable to spin at a high speed, and the dyeability of the dull polyamide 56 fiber can be enhanced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fail within the scope of the following claims.

What is claimed is:

1. A method for manufacturing a dull polyamide 56 fiber, comprising:
   providing a plurality of bright polyamide 56 chips;
   providing a viscosity adjusting step, wherein a relative viscosity in sulfuric acid of the bright polyamide 56 chips is adjusted to a range of 2.90 to 3.00;
   providing a moisture adjusting step, wherein a moisture content of the bright polyamide 56 chips is adjusted to a range of 350 ppm to 550 ppm; and
   providing a spinning step, comprising:
      providing a plurality of dull polyamide 6 chips, wherein the dull polyamide 6 chips comprise titanium dioxide ($TiO_2$); and
      providing a blending step, wherein the dull polyamide 6 chips and the bright polyamide 56 chips dealt with the viscosity adjusting step and the moisture adjusting step are melted and blended, and then spun at a temperature ranging from 275° C. to 285° C., thus the dull polyamide 56 fiber is obtained.

2. The method for manufacturing the dull polyamide 56 fiber of claim 1, wherein the dull polyamide 56 fiber comprises from 0.25% to 2.0% by weight of the titanium dioxide.

3. The method for manufacturing the dull polyamide 56 fiber of claim 1, wherein the dull polyamide 6 chips comprise 20% by weight of the titanium dioxide, and an adding amount of the dull polyamide 6 chips is greater than 0 part by weight, and is lesser than or equal to 10 parts by weight based on 100 parts by weight of the bright polyamide 56 chips.

4. The method for manufacturing the dull polyamide 56 fiber of claim 1, wherein in the blending step, the dull polyamide 6 chips and the bright polyamide 56 chips dealt with the viscosity adjusting step and the moisture adjusting step are melted and blended so as to form a spun liquid, and the spinning step further comprises:
   providing a fiber spitting step, wherein the spun liquid goes through a spinneret so as to form a nascent fiber, a difference between a relative viscosity in sulfuric acid of the nascent fiber and the relative viscosity in sulfuric acid of the bright polyamide 56 chips dealt with the viscosity adjusting step is ΔRV, and the following relationship is satisfied:

0<ΔRV<0.1.

5. The method for manufacturing the dull polyamide 56 fiber of claim 4, wherein the spinning step further comprises:
   providing a cooling step conducted at a temperature ranging from 18° C. to 22° C., wherein the nascent fiber is solidified so as to form a solidified fiber.

6. The method for manufacturing the dull polyamide 56 fiber of claim 5, wherein the spinning step further comprises:
   providing a drawing step, wherein the solidified fiber is drawn with a draw ratio ranging from 1.2% to 1.5%.

7. The method for manufacturing the dull polyamide 56 fiber of claim 6, wherein the drawing step comprises:
   providing a heating step, wherein the solidified fiber is heat set at a temperature ranging from 145° C. to 200° C.

8. The method for manufacturing the dull polyamide 56 fiber of claim 6, wherein the spinning step further comprises:
   providing a winding step, wherein the solidified fiber dealt with the drawing step is wound in a speed ranging from 3200 m/min to 4800 m/min, and a physical property of the solidified fiber is changed by the drawing step and the winding step, so that the solidified fiber is transformed into the dull polyamide 56 fiber.

9. The method for manufacturing the dull polyamide 56 fiber of claim 8 wherein the physical property of the solidified fiber is strength or elongation.

10. A dull polyamide 56 fiber made by the method according to claim 1, wherein a denier per filament of the dull polyamide 56 fiber is 0.5 dpf to 6 dpf, and a strength of the dull polyamide 56 fiber is 3.0 g/d to 6.8 g/d.

* * * * *